Jan. 16, 1934.    C. E. BRANICK    1,943,784
AUTOMATIC TIRE SPREADER
Filed April 13, 1931    2 Sheets-Sheet 1
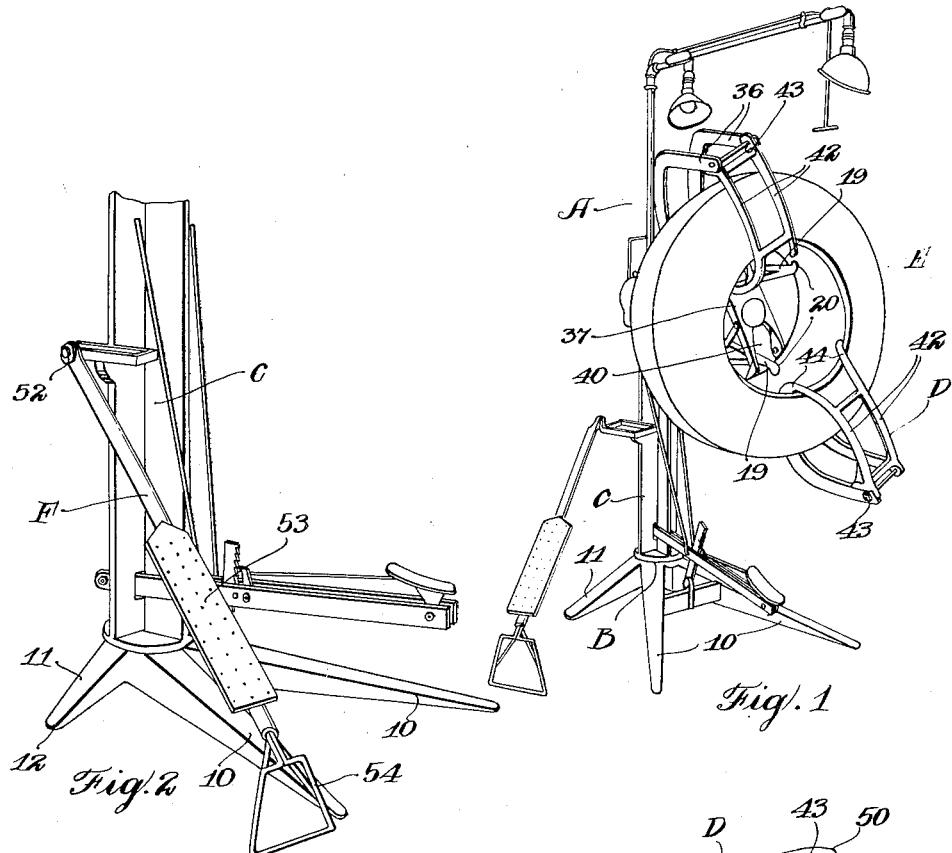
Fig. 1
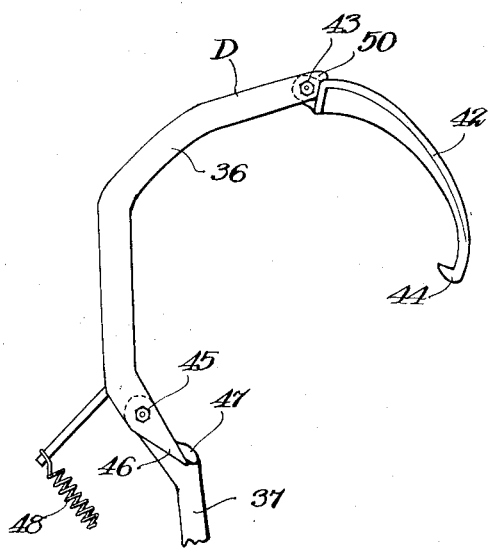
Fig. 2
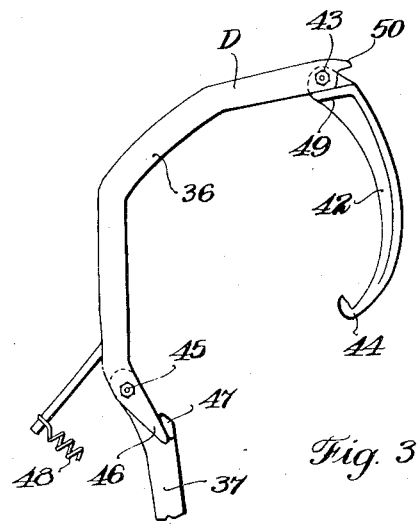
Fig. 3
Fig. 4
Inventor
Charles E. Branick
By Horan Fincher
Attorney Jan. 16, 1934.  C. E. BRANICK  1,943,784
AUTOMATIC TIRE SPREADER
Filed April 13, 1931  2 Sheets-Sheet 2
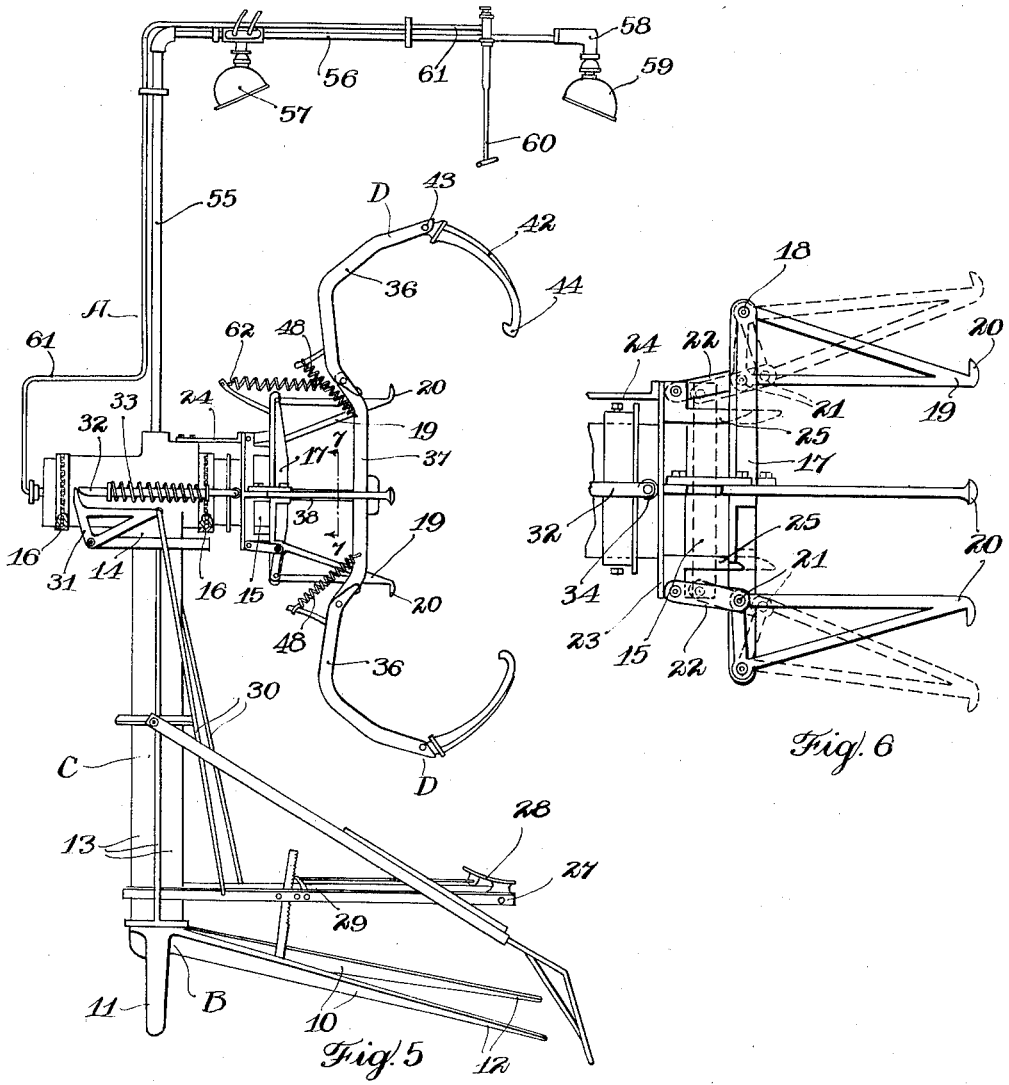
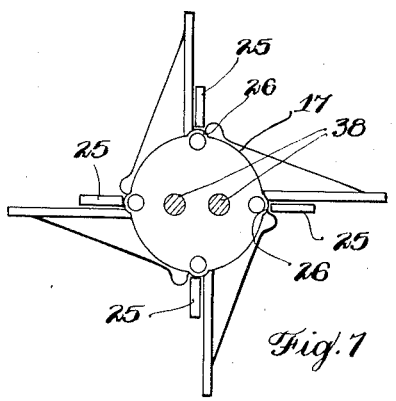
Inventor
Charles E. Branick
By Howard Richey
Attorney Patented Jan. 16, 1934

1,943,784

UNITED STATES PATENT OFFICE 1,943,784

AUTOMATIC TIRE SPREADER

Charles E. Branick, Fargo, N. Dak., assignor to Branick Manufacturing Company, Incorporated, Fargo, N. Dak., a corporation of North Dakota Application April 13, 1931. Serial No. 529,614

15 Claims. (Cl. 154—9)

This invention relates to tire spreaders and is designed to provide an automatic spreader for a tire, so that the same may be inspected readily when placed upon the spreader and opened to permit free examination of the lining or inside of a tire casing.

In the heavy balloon tires which are used on automobiles today, it is rather difficult to spread the same so that the inner lining may be readily inspected and repaired. With my tire spreader, I accomplish this result by an automatic spreading device which includes a cylinder, operated by air or other means which operates the cylinder to cause the tire engaging arms to spread the tire casing quickly and without making it necessary for the operator to manipulate more than the control lever which causes the air to operate the spreader cylinder.

This spreader includes a standard with a peculiarly formed base having means of extending forwardly in the direction of the load of the spreader to give the proper balance and shaped or tapered away so that the operator may walk around and up to the machine without interference by the legs of the base of the standard.

The upper end of the standard is formed to support the cylinder of the spreader and extending upwardly from the same, I provire a suitable means for carrying the lighting members to light up the tire from the different sides and also to provide a suitable bracket means for supporting the operating handle of the spreader.

The spreader is designed to conveniently handle a tire casing so as to open it up quickly for inspection and permit the tire to be turned round and round to inspect the entire inside of the casing by the operator without a laborious operation and to permit the operator to make such repairs as are practical while the casing is held in the spreader. The simplicity of the spreader is a feature of importance including the arrangement of the spreading members and their operation.

A pair of overhanging hook spreader members operate to engage the near side of the tire casing in relation to the operator standing in front of the machine. These overhanging hook members do not obscure the view of the operator and also are designed to flex in a manner to permit them to be easily engaged in the casing or to be moved up out of the way so that the tire casing may be placed upon the inner supporting fingers.

It is also a feature to provide the inner fingers with means for radially adjusting the same and holding these fingers locked in this position and when released, causing them to contract into inoperative position. These casing engaging fingers are operated by a foot means which permits the operator to have both hands free in handling the casing.

The particular details and objects, together with other advantages will be more fully set forth.

In the drawings forming a part of the specification:

Figure 1 is a perspective view of my tire spreader in operation.

Figure 2 is a perspective detail of a portion of the same.

Figure 3 is a side view of a detail of a portion of the overhanging hook members.

Figure 4 is a similar view to Figure 3 with the parts in a different position.

Figure 5 is a side view of my tire spreader with the parts diagrammatically illustrated.

Figure 6 is an enlarged detail of the inner tire engaging fingers showing the expanded position in dotted outlines.

Figure 7 is a section on the lines 7—7 of Figure 5.

The drawings illustrate the tire spreader A which is formed with a base portion B adapted to support the angle iron standard C extending upward from the same.

The base B is formed with long forwardly extending beveled foot portions 10 which project on either side of the center from a position straight in front of the spreader A, while shorter foot portions 11 extend to either side of the standard C. The short foot portions 11 are also of a beveled nature tapering down like the front foot portions 10 to a thin end such as 12 which lies close to the floor on which the foot portions 10 and 11 are adapted to rest. The long forwardly extending foot portions 10 of the base B act to balance the weight of the spreader A so that a support is provided in the base B of a nature and character to hold the spreader A in firm position upon the floor on which it rests and to permit the spreader to be positioned with the back portion of the same up near a wall if it is desired.

The standard C may be made in any suitable manner and as illustrated, it is formed of plate-like members 13 which extend virtually at right angles to each other and are adapted to support the head portion 14. The head portion 14 on the standard C provides the cylinder housing which supports the cylinder 15 in the ball bearings 16 so that the cylinder 15 is freely rotatable in operation.

On the front end of the cylinder 15, I provide a cylinder spider 17 which is rotatable with the cylinder 15 but stationary in so far as moving away from the cylinder is concerned. To this spider are pivotally attached at 18, tire casing engaging fingers 19 with hook ends 20 formed out on the free ends thereof so that a tire may be placed on the hook ends 20 when it is desired. The tire engaging fingers 19 are in the form of triangular shaped brackets and are pivotally connected at 21 to the links 22 which in turn connect with the slidable spider collar 23 mounted upon the front end of the cylinder 15. A suitable stop 24 limits the inward movement of the slidable spider collar 23.

The sliding spider collar 23 is provided with guide fingers 25 which operate in the grooves 26 formed in the cylinder spider 17 so as to hold the sliding spider sleeve 23 against rotation excepting as rotating in its entirety with the cylinder spider 17. The slideable spider sleeve 23 is adapted to be operated by the foot lever 27 which is formed with a pivoted foot treadle 28 adapted to operate a ratchet lock 29. The lever 27 operates to move the rods 30 in a manner to operate the bell crank 31 which in turn operates against the rod 32 to move the same against the action of the spring 33 and cause the rod 32 to push the sliding spider collar 23 out in a manner to move the hook ends 20 of the bracket members 19 radially to expand the same from their normal position. The outer bearing end of the rod 32 is provided with an anti-friction wheel 34 which bears against the sliding spider collar 23. There are two rods 30 extending up from the lever 27 on either side of the standard C. These rods operate the two bell cranks 31 and the rods 32 which are positioned on either side of the cylinder housing 14. This provides a means of operating the bracket tire engaging fingers 19 into the position illustrated in dotted outline in Figure 6.

Normally the tire engaging fingers 19 are contracted as illustrated in full lines in Figure 6 and they may be adjusted by the foot lever 27 to spread the fingers into engagement with the inner edge of the tire casing when the same is placed upon these fingers. The fingers are held in locked engaging position by the ratchet 29 which is released by the foot treadle 28 when it is desired.

Overhanging hook spreader members D which are formed with the inner arms 36, are carried by the piston head extension 37. The piston head extension 37 is carried by the piston rods 38 which extend out through the spider 17 and end of the cylinder 15 and are operated by the piston in the cylinder in a manner to cause the piston head extension 37 to be moved out away from the head of the cylinder 15 or from a point adjacent the spider 17 out into a position such as is illustrated in Figure 5.

The piston head extension 37 is formed with recesses 40 on either side of the center as illustrated in Figure 1 so that the hook ends 20 may extend through the same on the diametrically opposite tire engaging fingers 19.

The overhanging spreader members D are provided with outside spreader arm units 42 formed with a pair of arms extending from the pivotal connection 43 where they are connected with the inside arm members 36. The spreader arm units 42 extend outwardly from the arms 36 and are provided with hook ends 44 which are adapted to engage inside the tire casing to engage and spread the same when the piston is operated in the cylinder 15 so that the tire casing such as E may be spread open to permit free inspection of the inside of the same as illustrated in Figure 1.

The arms 36 are pivotally connected at 45 to the piston head extension 37 and are formed with extending ends 46 which engage against the stop 47 formed on the piston head extension 37 to limit the movement of the arms 36 in a backward direction. These arms 36 are held normally against the shoulder 47 by the springs 48. This normally holds the pivot connecting end 43 out in an expanded position so as to raise the inner ends of the units 42 or to expand the same as much as possible away from the tire engaging fingers 19.

The units 42 hang from the pivot point 43 where they connect with the arms 36 with the hook ends 44 hanging freely down away from the pivot point 43. A shoulder portion 49 which engages against the side of the arms 36 formed on the unit 42 limits the inward swinging movement of the free ends 44 of the units 42 and a shoulder portion 50 projecting from the outer ends of the arms 36 limits the lifting movement of the units 42. These shoulders 49 and 50 keep the unit arms 42 in operative position as illustrated in Figure 5 so that they will not swing too far inward when they are at the top or too far down out of the way when they are at the bottom. In other words, these units 42 should be held ready so that when a tire casing such as E is placed upon the fingers and they are expanded by the foot operating lever 27, that then the outside spreader arm units 42 can be placed over the tire casing with the hook ends 44 engaging within the bead of the same. The pivotal connection 45 permits the arms 36 to be pulled down so as to fit the overhanging hook spreader members D about the tire casing.

The overhanging hook spreader members D extend over the casing such as E, as illustrated in Figure 1, and the hook ends 44 of the same are spread apart so that free inspection may be made of the inner surface of the casing E when it is held by the spreader A. While the tire casing E is held in this manner, it may be rotated freely, owing to the fact that both the overhanging spreader members D, together with the spider 17 which carries the fingers 19 rotate in the rotation of the cylinder 15 in the bearings 16. The whole tire casing spreader means rotates freely and this permits the casing to be easily inspected while it is spread out in a wide open position. The bearings 16 form a means to permit the free rotation of the cylinder 15 with its connecting and operating parts.

The spreader A is provided with a tire hoist F which is pivotally connected at 52 on one side of the standard C. The tire hoist is formed with a tire platform 53 between the ends of the same and the outer free end is formed with a loop end 54. The hoist F is provided for heavy tire casings so that the operator may roll the tire on to the hoist and then by engaging the loop end 54, lift the tire into position on to the fingers 19. The pivotal connection 52 of the hoist F permits the same to be swung to one side of the spreader as is illustrated in Figure 1 when the hoist is not desired for use.

Extending from the upper end of the standard

C, I provide a tubular supporting member 55 which may be made of piping or other suitable means and which forms a support for the horizontally extending tubular portion 56. The portion 56 may form a means for supporting an electric lamp 57 adjacent the supporting member 55, while the outer end of the portion 56 may be provided with a bracket arm 58 which is adapted to support the electric light 59. By means of the lights 57 and 59 which are supported above the tire spreading mechanism, the tire casing may be readily inspected on all sides. The members 55 and 56 form a bracket supporting means for supporting the operating lever 60 which operates the air line 61 extending to the cylinder 15. By means of the lever 60, the air may be turned on or off to the cylinder 15 so as to operate the piston in the cylinder 15 to cause the piston head extension 37 to be carried outwardly against the action of the spring 62 which normally holds the piston head extension 37 adjacent the spider 17. When the lever 60 turns the air on to the cylinder 15, the piston rods 38 will force the piston head extension 37 outwardly causing the tire engaging overhanging hook spreader members D to spread the casing E. When the air is released from the cylinder 15, the casing E will assist the spring 62 in moving the overhanging tire spreader members D back to normal position, excepting that the hooks 44 will be engaged within the bead of the casing E and remain there until they are disengaged by the hand of the operator.

The spreader A is of a simple character with the supporting base B which extends close to the floor while the standard C supports the cylinder 15 in the cylinder housing 14 freely rotatable. The tire casing is placed upon the contracted tire engaging fingers 19 which are expanded by the foot lever 27 and this is locked by the ratchet 29, then the hook ends 44 are engaged inside of the tire casing and by applying the air through the operating lever 60, the tire casing E is spread wide open, ready for inspection and held so that it will rotate freely. All of this operation takes but a few moments. The tire is held by the spreader A with the weight of the same, together with the weight of the spreader being extended forwardly from the standard C, and thus the long supporting foot portions 10 balance the load and owing to their peculiar nature, permit the operator to walk closely around and about the spreader without interfering with the same.

My tire spreader can be changed by simply changing the length of the link 42, so that the machine will easily accommodate any diameter tire that may ever be built, and the trend today is towards smaller diameter tires.

In accordance with the patent statutes, I have set forth the best embodiment of my tire spreader, however, I desire to have the same interpreted within the scope of the following claims.

I claim:

1. A tire spreader including, a standard, a base portion having elongated tapered foot portions, beveled from said standard to the point of contact with the floor, an operating cylinder, a cylinder housing horizontally disposed on the top of said standard, roller bearings in said housing for carrying said cylinder rotatably in said housing, piston rods projecting out of said cylinder, a piston head extension connected to said rods, overlying casing engaging units carried by said piston head extension adapted to extend over the outside of a tire casing, a cylinder spider carried on the front end of said cylinder, a series of radially adjustable tire engaging fingers carried by said spider, and foot lever means for operating said tire engaging fingers carried by said spider.

2. A tire spreader comprising, a rotatable cylinder, a housing having bearing means for supporting said cylinder rotatably therein, means for directing pressure to said cylinder to operate the piston therein, piston rod means, a piston head extension secured to the outer end of said piston rod means, casing engaging units carried by said piston head extension having adjustable hook ends for engaging a tire casing on one side of the bead thereof, and adjustable tire engaging fingers having hook ends to engage the other bead of the tire casing, said fingers being radially adjustable, and fixed to rotate with said cylinder, said casing engaging units being movable to spread a tire casing engaged by said tire fingers and said casing engaging units to hold the same rotatable in wide open position.

3. A tire spreader including, finger and hook means for engaging the beads of the tire casing on either side thereof in a manner to spread the tire casing apart, one of said tire spreading means overlying the casing to provide an open unobstructed side for the operator to inspect the inside of the tire casing, spring means for holding said overlying means in engagement with the tire bead, under spring tension means for operating the tire spreading means by air pressure to virtually instantaneously spread the tire, and means for supporting said operating means rotatably.

4. An automatic tire spreader including, an air cylinder, means for supporting said cylinder rotatably, a standard for supporting said cylinder, a standard bracket projecting above said cylinder adapted to support lighting means therefrom, a base portion on said first standard providing an unobstructed support in the base to the operator of said spreader, tire casing engaging means carried by said cylinder, one portion thereof extending about the outside of the casing with hook portions on the free ends thereof, the other portion engaging the bead on the other side of the casing and adapted to remain fixed with said cylinder, and means for moving the overlying casing engaging means to spread the tire casing wide open automatically in the operation of said cylinder.

5. An automatic tire spreader including, an air cylinder, means for horizontally mounting said cylinder rotatably between spaced apart antifriction bearings, a spider carried by the front end of said cylinder, adjustable bead engaging hooks carried by said spider, means for adjusting said hooks, adjustable tire engaging hooks having arms adapted to overlie the outer portion of the tire casing, a piston head extension adapted to support said overlying arms, and piston rod means adapted to operate said piston head extension with said arms to spread a tire casing supported on said adjustable bead engaging hooks.

6. An automatic tire spreader including, an air cylinder, anti-friction means for supporting said cylinder in a horizontal position, adjustable tire casing bead engaging hooks supported by said cylinder and adapted to rotate therewith, foot lever means for adjusting said hooks to fit the bead of the tire casing supported thereby, adjustable casing bead engaging units having arms extending over the outside of the tire casing, and piston rod means for supporting said units whereby when air is directed to said cylinder said units will move away from said hooks to spread a tire casing held therebetween and support the same freely rotatable with the tire casing wide open and free to be inspected from one side thereof.

7. An automatic tire spreader including, an air cylinder, a standard for supporting said cylinder rotatably, adjustable tire casing engaging fingers, tire engaging hooks adapted to extend around the outside of the tire having bead hooks on the free ends thereof, means for operating said hooks to move away from said tire engaging fingers to spread a tire casing, said fingers and said hooks being supported by said cylinder in a manner to rotate with the same, spring means for positioning said tire hooks, and spring means for returning said tire hooks to normal position after spreading a tire.

8. An automatic tire spreader including, an air cylinder, a standard for supporting said cylinder rotatably, tire spreading means carried by one end of said cylinder including expandable bead engaging fingers with hook ends, foot lever means for operating said fingers, means for holding said fingers in locked operative position, outer bead engaging hooks having link arms extending over the tire casing when the same is held by said fingers and said hooks, said hooks and link arms being operative to be automatically moved to spread a tire by the operation of the piston in said cylinder and rotatable to permit inspection of the inside of a tire casing supported by said spreader.

9. A tire spreader including, a rotatable tire spreading means, a rotatable air cylinder for operating said means, a standard for supporting said spreader means elevated from the floor, said spreader being adapted to hold a tire in upright position and in a manner so that the same may be rotated freely when spread to inspect the inside of the tire casing unobstructed from the inspection side, and illuminating means associated with said spreader means to facilitate easy inspection of a tire casing held by said spreader.

10. A tire spreader including, an automatic air cylinder, tire spreading means carried by said cylinder, means for supporting said cylinder rotatably with said spreading means, said spreading means including members adapted to extend over from one side to the other of the tire casing with hooked free ends to spread a tire casing and support the same with an unobstructed view for the operator to inspect the inside of the casing as well as the outside from one side thereof, and illuminating means for said spreader.

11. The combination of, an automatically operated air cylinder, means for supporting said cylinder rotatably, tire casing spreader means supported to rotate with said cylinder, said spreader means including members adapted to extend from one side to the other of the tire casing to be spread to provide an unobstructed view for the operator when the tire casing is held for inspection, said cylinder being adapted to automatically operate said tire spreading means to spread the tire casing held thereby and being freely rotatable, and means for supporting illuminating means close to said spreading means to facilitate the inspection of a tire casing supported in said spreader.

12. The combination of, an air cylinder, means for supporting the same rotatably, tire spreading means including fixed engaging fingers in relation to said cylinder and having means for radially adjusting said fingers to different size tires, hooks positioned to extend around the outside of a tire casing, means supporting said hooks to be operated by the piston of said cylinder, said hooks engaging the bead of the tire casing supported on said fingers on the opposite bead to the engagement by said fingers, said hooks forming a supporting and spreading means to permit a free unobstructed view to the operator of the inside of the tire casing supported thereby for inspection and repair.

13. The combination of, a pneumatic cylinder, means for rotatably supporting the same on a standard, tire spreading means carried by one end of said cylinder including hook members adapted to extend around the outside of a tire casing, said hooks being operated by said cylinder to spread the tire casing held by said spreading means, and illuminating means for said spreader.

14. A tire spreader including, means for spreading the sides of a tire casing apart, and tire lifting means associated with said spreader to permit the lifting of heavy truck tires up to said spreading means.

15. A tire spreader including, a standard, a tire supporting and spreading means carried by said standard, and a lifting hoist associated with said standard to lift heavy truck tires up to said spreading means.

CHARLES E. BRANICK.